Feb. 16, 1954 — J. L. HINSON — 2,669,083
CUTTER FOR FORAGE HARVESTERS
Filed Oct. 23, 1951 — 2 Sheets-Sheet 1

INVENTOR
JAMES L. HINSON
BY
McMorrow, Berman & Davidson
ATTORNEYS

Feb. 16, 1954 J. L. HINSON 2,669,083
CUTTER FOR FORAGE HARVESTERS
Filed Oct. 23, 1951 2 Sheets-Sheet 2

INVENTOR
JAMES L. HINSON

BY
McMorrow, Berman + Davidson
ATTORNEYS

Patented Feb. 16, 1954

2,669,083

UNITED STATES PATENT OFFICE 2,669,083

CUTTER FOR FORAGE HARVESTERS

James L. Hinson, Winfield, Kans., assignor of twenty-five per cent to Frank R. Webb, Arkansas City, Kans.

Application October 23, 1951, Serial No. 252,639

2 Claims. (Cl. 56—294)

This invention relates to forage harvesters and more particularly to a machine for comminuting standing forage, storing and transporting the comminuted forage and discharging the stored forage at selected times.

It is among the objects of the invention to provide an improved forage harvester which will simultaneously cut and chop up or triturate green standing forage, such as alfalfa, and will store the forage as it is cut and chopped and discharge it at periodic intervals under control of the operator of the harvester; which utilizes a reel type cutter element disposed at the front of the harvester and effective to move the uncut forage into the cutter, cut and chop up the forage and throw the chopped up or triturated forage back into a storage compartment constituting a portion of the harvester; which has a power operated live bottom in the storage compartment for discharging the stored forage therefrom; which has an auxiliary frame pivotally mounted intermediate its length on the main frame of the machine and carrying the cutter at one end and a harvester driving engine at its other end, so that the weight of the cutter is counterbalanced by the weight of the engine and the cutter can float up and down as it moves over the ground; and which is simple and durable in construction, economical to manufacture, and positive and efficient in operation.

Other objects and advantages will become apparent from a consideration of the following description and the appended claims in conjunction with the accompanying drawings wherein:

Figure 1:
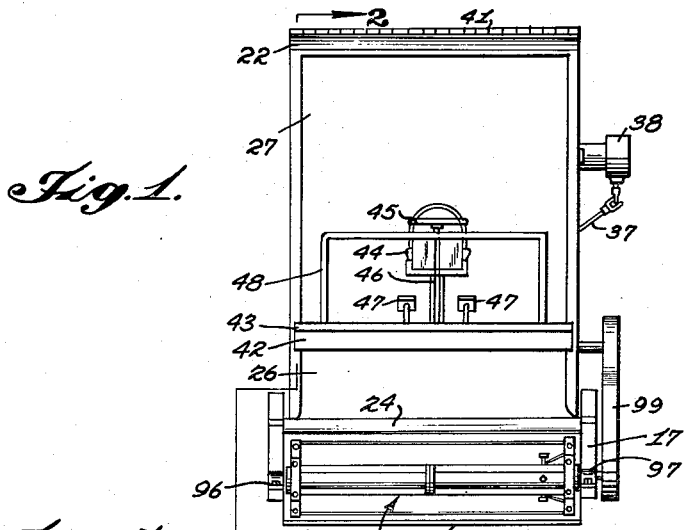
Figure 1 is a front elevational view of a forage harvester illustrative of the invention.
Figure 4:
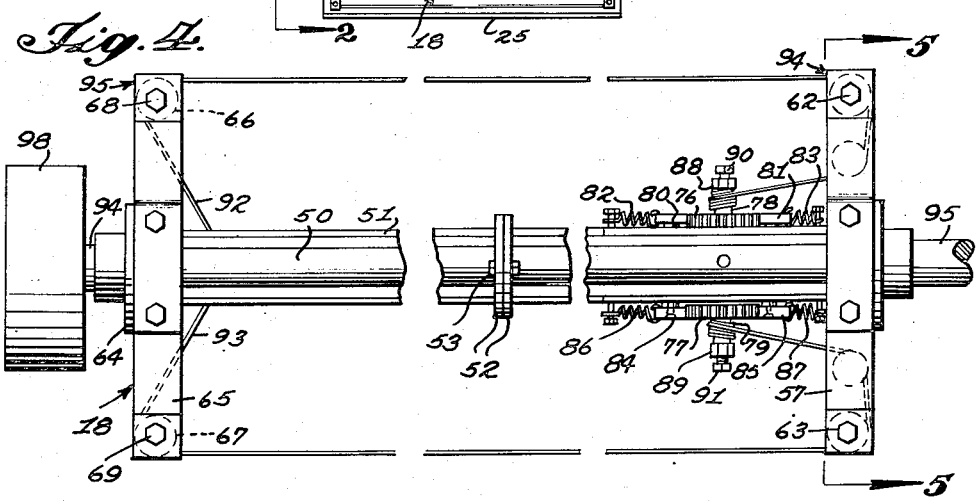
Figure 4 is an enlarged side elevational view of a reel type cutter constituting an operative component of the harvester.
Figure 5:
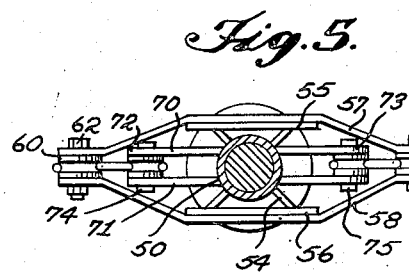
Figure 5 is a transverse cross sectional view on the line 5—5 of Figure 4.
Figure 6:
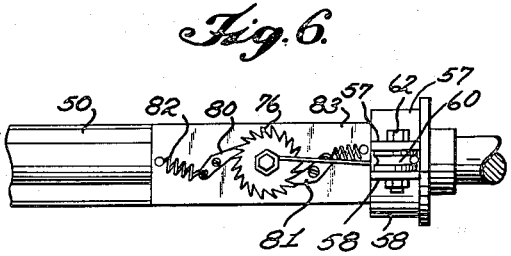
Figure 6 is a fragmentary elevational view showing structural details of the cutter.

With continued reference to the drawings, the harvester comprises a main frame 10 mounted on front drive wheels 11 arranged on two spaced apart and substantially parallel axles with double wheels at each end of each axle, and a pair of steerable rear wheels 12. An auxiliary frame 13 is pivotally mounted intermediate its length on the main frame 10 intermediate the length of the main frame and is disposed somewhat above the main frame. The pivotal connection between the auxiliary frame and the main frame is provided by the apertured ears or lugs 14 on the auxiliary frame, one at each side thereof, and the pivot pins 15 extending through the apertures in the lugs 14 and secured to upright standards 16 disposed one at each side of the main frame and constituting elements of the latter. The auxiliary frame has a tapered portion inclined downwardly and forwardly from the front end of the main frame, as indicated at 17, and a reel type cutter, generally indicated at 18 and illustrated in detail in Figures 4, 5 and 6, is journaled on the auxiliary frame at the front end thereof. A harvester driving engine 19 is mounted on the auxiliary frame at or near the rear end of the latter and counterbalances the cutter 18, so that the cutter can easily float up and down as it moves over the ground.

A gear unit 20 is mounted on the auxiliary frame below the engine 19 and the engine is drivingly connected to this gear unit and through the gear unit 20 and a transmission unit 21 to the drive wheels 11 of the harvester.

A curved or rounded housing 22 is mounted on the main frame 10 of the harvester and provides a storage compartment 23 the front end of which is disposed adjacent the reel type cutter 18. The cutter is partially enclosed in an auxiliary housing having end walls and transversely curved upper and lower portions 24 and 25. This housing is open at its front and rear sides and a duct 26 is secured to the housing in surrounding relationship to the opening in the rear side thereof and projects upwardly and rearwardly from the cutter housing. A rounded shield 27 extends upwardly and rearwardly from the upper end of the duct 26 and closes the open front end of the housing 22. The upper end of this curved shield is disposed within the upper portion of the housing and the overlapping portions of the housing and shield are curved on arcs centered on the pivotal connection between the auxiliary frame 13 and the main frame 10, so that the shield can move freely relative to the housing as the auxiliary frame pitches relative to the main frame.

A live bottom 30 is provided in the housing 22 and comprises a bottom plate 34, rollers 31 and 32 extending transversely of the housing, one at each end of said bottom plate, a frame mounted on the standard 16 and on standards 33 projecting upwardly from the main frame and supporting the rollers 31 and 32 for rotation about their longitudinal center lines as axes, link chains as indicated at 36, trained over chain sprockets secured one on each end of each roller and slats 35 extend between and are connected at their ends to these chains. An adjustable length drive shaft 37 is connected at one end to the gear unit 20 and extends from this gear unit to a gear unit 38 mounted on the live bottom frame and drivingly connected to one end of the upper roller 32 for driving the live bottom 30 from the harvester engine 19.

Manual control means including a link 39 extends from the gear unit 20 and is effective to connect the shaft 37 to the gear unit or disconnect it therefrom, so that the operation of the live bottom can be manually controlled to discharge material from the storage compartment 23 at times selected by the operator of the harvester.

Figure 2:
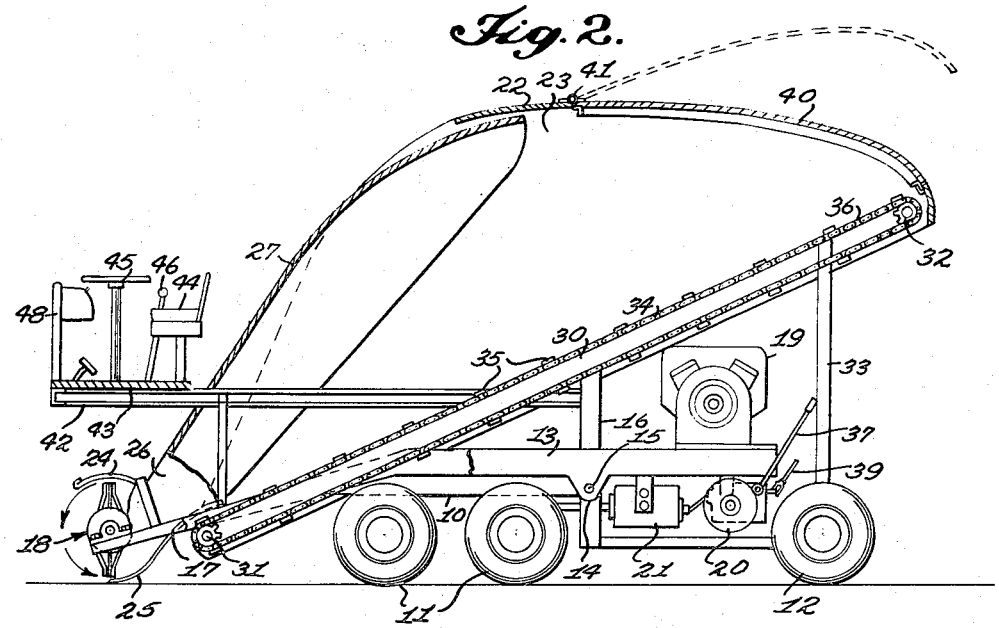
Figure 2 is a longitudinal cross sectional view on the line 2—2 of Figure 1.
Figure 3:
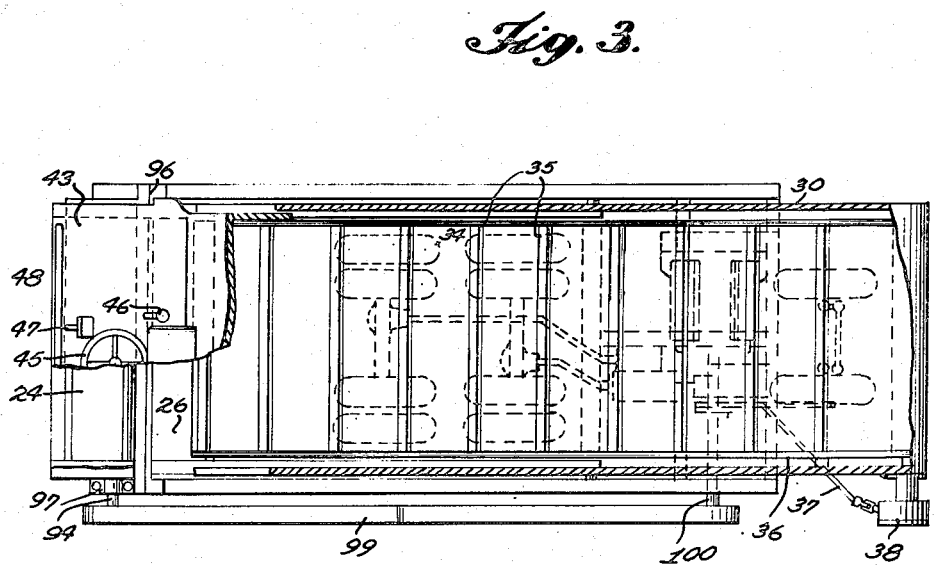
Figure 3 is a top plan view of the harvester with portions broken away and shown in cross section to better illustrate the construction thereof.

A hinged flap 40 is connected at its front end to the rear edge of the housing 22 by a suitable hinge 41 and extends over the rear, open portion of the housing. This flap is raised by the pressure of stored forage material thereunder when the live bottom is put in motion, as indicated in dotted lines in Figure 2, so that the stored forage can be discharged from the storage compartment over the rear, upper roller 32 into a truck or wagon placed beneath the rear end of the live bottom 30 of the storage compartment.

A platform frame 42 is mounted on the main frame 10 of the harvester and extends forwardly of the front shield 27. A platform 43 is mounted on the frame 42 ahead of the shield 27 and carries a driver's or operator's seat 44, a steering wheel 45, suitable control levers and pedals, as indicated at 46 and 47, and a guardrail or dash 48 at the front edge thereof. The steering wheel is connected to the rear steering wheels 12 by suitable means, not illustrated, and the control levers and pedals are connected to the engine and to the gear or transmission units by suitable connecting means, illustration of which has been omitted in order to simplify the illustration.

The reel type cutter 18 has a rigid frame journaled at its ends on the auxiliary frame 17 of the harvester and cutting elements in the form of flexible strands stretched on the frame in spaced and substantially parallel relationship to the rotational axis of the cutter and at respectively opposite sides of the rotational axis. This cutter reel, when driven at high speeds, pulls the standing forage downwardly and into the cutter and chops the forage into short pieces and then throws the pieces rearwardly through the rear opening in the cutter housing and the duct 26 into the storage compartment 23 where they are supported on the live bottom 30.

When the harvester has been operated until the storage compartment is substantially filled with cut and chopped up forage, the machine is stopped, a suitable wagon or truck is moved under the rear upper end of the live bottom 30, and the live bottom is then placed in operation to discharge the material in the storage compartment over the rear roller 32 of the live bottom and into the truck or wagon. After the material has been discharged from the storage compartment, the operation of the live bottom is discontinued and the harvester again placed in operation to refill the storage compartment.

Referring particularly to Figures 4, 5 and 6, the cutter 18 comprises a tubular central member 50 having external ribs 51 extending longitudinally thereof at substantially equal angular intervals therearound. In the arrangement illustrated, the central member is formed in two substantially equal parts joined together in end to end relationship by the external flanges 52 and flange bolts 53 located substantially at the mid-length location of the member.

Spoke structures, as particularly illustrated in Figure 5, are mounted on the central member 51 near each end thereof and includes flat spokes 54 projecting radially from the central member at angular intervals of 90 degrees therearound and flat plates 55 and 56 supported by the spokes at respectively opposite sides of the central member and disposed in spaced apart and substantially parallel relationship to each other.

Flat bars 57 and 58 are secured intermediate their lengths to the plates 55 and 56 at the outer sides of the latter and extend beyond the ends of the plates. The bars 57 and 58 converge beyond the opposite ends of the plates and are substantially coterminous, being so arranged that a plane perpendicular thereto and passing through their mid-length locations also passes through the longitudinal center line or axis of the central member 50. Grooved rollers 60 and 61 are disposed between the bars 57 and 58 at the opposite ends of these bars and are journaled on the bars by suitable means, such as the pivot bolts 62 and 63 extending through registering apertures in the bars and the rollers.

A similar spoke structure including flat plates, one of which is indicated at 64, and flat bars, one of which is indicated at 65, is mounted on the central member 50 near the other end of the latter and the bars of this other structure carry grooved rollers 66 and 67 journaled on the bars by the pivot bolts 68 and 69.

Additional bars 70 and 71 are disposed at respectively opposite sides of the central member 50 adjacent the bars 57 and 58 and are disposed in spaced apart and substantially parallel relationship to each other and in parallel relationship to the plates 55 and 56. These additional bars 70 and 71 are shorter than the bars 57 and 58, and grooved rollers 72 and 73 are disposed between the bars 70 and 71 at the opposite ends of these bars and are journaled on the bars by pivot bolts 74 and 75 extending through registering apertures in the bars 70 and 71 and the rollers 72 and 73. The rollers 72 and 73 are disposed inwardly of the rollers 60 and 61 and the arrangement is such that all of the rollers including the rollers 66 and 67 are disposed in a common plane which passes through the longitudinal center line or axis of the central member 50.

Ratchet wheels 76 and 77 are journaled on the central member 50 adjacent the bars 57 and 58 at respectively opposite sides of the central member and cable spools 78 and 79 are carried by the ratchet wheels 76 and 77 respectively, centrally thereof and projecting outwardly from the sides of the ratchet wheels remote from the central member. Ratchet dogs 80 and 81 are pivotally mounted on the central member and urged into engagement with the ratchet wheel 76 by tension springs 82 and 83 respectively, and similar ratchet dogs 84 and 85 are pivotally mounted on the central member and urged into engagement with the ratchet wheel 77 by the tension springs 86 and 87 respectively. At their ends remote from the corresponding ratchet wheels the spools 78 and 79 are provided with polygonal formations 88 and 89 respectively, for the application of a suitable tool, such as a wrench, to rotate the ratchet wheels and stud bolts 90 and 91 extend into bores in the spools from the outer ends of the polygonal formations and are threaded into tapped holes in the ends of an arbor, not illustrated, which extends transversely through the central member 50 and on which the ratchet wheels are journaled.

Flexible strands, 92 and 93, formed of lengths of suitable material, such as wire or wire cable, are secured each at one end to the central member adjacent the inner edges of the bars of the structure including the bar 65 and are carried over the grooved rollers 66 and 67 and over the grooved rollers 60 and 61, so that they extend between the outer ends of the cable carrying structures, generally indicated at 94 and 95, spaced from and substantially parallel to the central member 50. These strands 92 and 93 are carried under the grooved rollers 72 and 73 respectively, and at their other ends they are wound on the spools 78 and 79, so that tension can be applied thereto by rotating the corresponding spools and ratchet wheels. The spring pressed pawls engaging the ratchet wheels will hold the cables under tension between the cable supporting structures.

Stub axles 94 and 95 are secured one in each end of the central member 50 and project from the central member. These stub axles are journaled in bearings 96 and 97 carried by the auxiliary frame 13 at the front end of the latter and at the respectively opposite ends of the cutter element. A belt pulley 98 is secured on the stub axle 94 outwardly of the adjacent auxiliary frame member and a suitable belt, enclosed in a guard 99 connects the belt pulley 98 to a belt pulley on a shaft 100 projecting outwardly from the engine driven gear unit 20 to drive the cutter element.

As explained above, the cutter element, when driven by the engine 19, chops the standing forage into short lengths and throws the pieces of forage rearwardly onto the live bottom structure 30 where they are stored until the storage compartment 23 is substantially filled and from which they are discharged by driving the live bottom under manual control.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A cutter element for a forage harvester comprising a tubular central member having bearing means at its ends, strand supporting structures mounted on said central member one at each end thereof and extending perpendicularly to said central member substantially equal distances to opposite sides of the latter, grooved rollers carried by said strand supporting structures one at each end of each structure, ratchet devices mounted on said central member between said strand supporting structures, and flexible strands secured one at each end to said central member and carried over said grooved rollers and connected at their other ends to said ratchet devices, said strands being disposed at respectively opposite sides of said central member in spaced and substantially parallel relationship thereto and substantially in a plane including the longitudinal center line of said central member.

2. A cutter for a forage harvester comprising a tubular central member, means providing bearing arbors one at each end of said central member for supporting said cutter for rotation about the longitudinal center line of said central member as an axis, strand supporting structures mounted on said central member one near each end of the latter and disposed substantially perpendicular thereto, flexible strands carried by said strand supporting structures and disposed substantially parallel to said central member at substantially equal distances therefrom and at substantially equal angular intervals therearound, and manually adjustable means mounted on said central member and connected to said strands for tensioning said strands.

JAMES L. HINSON.

References Cited in the file of this patent

UNITED STATES PATENTS

| Number | Name | Date |
|--------|------|------|
| 865,161 | Coldwell | Sept. 3, 1907 |
| 2,164,467 | Mulno | July 4, 1939 |
| 2,228,512 | Fish | Jan. 14, 1941 |
| 2,630,668 | McDermott | Mar. 10, 1953 |